United States Patent [19]
Burger et al.

[11] Patent Number: 5,943,501
[45] Date of Patent: Aug. 24, 1999

[54] MULTIPLE PROCESSOR, DISTRIBUTED MEMORY COMPUTER WITH OUT-OF-ORDER PROCESSING

[75] Inventors: Douglas C. Burger; Stefanos Kaxiras; James R. Goodman, all of Madison, Wis.

[73] Assignee: Wisconsin Alumni Research Foundation, Wis.

[21] Appl. No.: 08/884,050

[22] Filed: Jun. 27, 1997

[51] Int. Cl.[6] .................................................. G06F 15/00
[52] U.S. Cl. ............................. 395/800.14; 395/800.3; 395/800.11
[58] Field of Search ........................... 395/800.3, 800.2, 395/800.11, 800.14, 379, 671

[56] References Cited

PUBLICATIONS

Kaxiras, Kiloprocessor Extension to SCI, Apr. 1996.
Kaxiras et al. The Glow Cache Coherence Protocol Extension for Widely Shared Data, May 1996.
Burger et al. Memory Band Width Limitations of Future Microprocessors, May 1996.
Burger System Level Implication of Processor–Memory Integration, Jun. 1997.
Burger et al. Data Scalar Architecture and SPSD Execution Model, Jun. 1997.

*Primary Examiner*—Larry D. Donaghue
*Attorney, Agent, or Firm*—Quarles & Brady

[57] ABSTRACT

A distributed memory computer architecture associates separate memory blocks with their own processors, each of which executes the same program. A processor fetching data or instructions from its local memory also broadcasts that fetched data or instruction to the other processors to cut the time required for them to request this data. Runs of instruction and data local to one processor providing improved performance that is captured by the system as a whole by the ability of the other processors not executing local data or instructions to execute instructions out of order and return to find the data ready in buffer for rapid use.

5 Claims, 3 Drawing Sheets

MULTIPLE PROCESSOR, DISTRIBUTED MEMORY COMPUTER WITH OUT-OF-ORDER PROCESSING

"This invention was made with United States government support awarded by the following agencies: NSF, Grant No. CCR-9207971. The United States has certain rights in this invention."

CROSS-REFERENCE TO RELATED APPLICATIONS

BACKGROUND OF THE INVENTION

The present invention concerns the architecture of electronic computers, and in particular, an architecture in which the principal memory of the computer is distributed among many distinct processor units.

Since the development of the single integrated circuit ("chip") microprocessor in the early 1970s, the amount of memory on the microprocessor chip has been increasing. Part of this trend is driven by speed considerations. Data and instructions held in on-chip memory are accessed much faster than those which must be obtained from an off-chip memory device.

Some recently announced microprocessors have as much as 90% of their transistors devoted to memory. Nevertheless, there are economic and practical limits as to how much memory can be put on a single integrated circuit.

BRIEF SUMMARY OF THE INVENTION

The present invention provides a computer architecture in which the performance typical of on-chip memories can be approached with large off-chip memories.

In the invention, the memory space is divided among a number of processors as on-chip memory to at least one of the processors. Because not all processors will then have access to all data on-chip, some data must be communicated between processors. The overhead of this communication is reduced by two techniques. First, each processor runs the same program so the processor that has the data needed by the other processors may anticipate their requests sending the data without prompting. This reduces the time required to transfer the data. Second, the processors used are capable of out-of-order instruction execution and therefore may use the time required for data transfer for the execution of other instructions. Additional gains are obtained by squashing instructions related to the storage of data that is not local to a particular processor.

As a result, much of the performance loss resulting from the use of off-chip memory is eliminated.

Specifically, the invention provides a method of executing a program made up of instructions and data on a computer system comprised of a plurality of processor/memory units each communicating on a common interconnect. The method divides the program (either data or instructions or both) among the processor/memory units. Each processor/memory unit then concurrently executes the same program.

A first processor/memory unit, having a portion of the program not loaded into a second processor/memory unit, communicates that portion over the common interconnect to the second processor/memory unit. The second processor/memory unit processes other portions of the program while waiting for the portion over the common interconnect. The first processor/memory unit may independently communicate the portion in response to its own execution of that portion of the program.

Thus, it is one object of the invention to provide the performance benefits associated with on-chip memories in a system with an arbitrarily large memory. As described above, by associating each memory unit with its own processor and having all processors running the same program, the need for data or instruction transmission between processors may be anticipated to cut down on delays in such data transmissions. Additional speed gains are obtained by out-of-order execution of instructions and the skipping of instructions that lead only to a store operation in off-chip memory. Ideally, any remaining communication overhead will be more than offset by the speed gains of accessing on-chip memory for periodic runs of local instructions executing on local data.

Some portions of the program may be stored in many of the processor/memory units and these "replicated" portions may be processed without communication on the common interconnect between the processor/memory units. The processor/memory units may further have a cache memory and instructions or data stored in the cache may be treated as if they are stored in the replicated memory.

Thus, it is another object of the invention to integrate cache structures into the present architecture. By treating the cache as replicated memory, the overhead of cache operation is minimized and the cache is easily integrated into the distributed memory model of the invention. In the case of speculation, the cache is updated only upon completion of the processing of the instructions (commitment).

Thus, it is another object of the invention to permit caching of instructions in an out-of-order processor while preserving the simple rule that the cache is treated as replicated memory. By updating the cache only when instructions are committed (e.g., in execution order), not when they are issued possibly out of execution order, all caches see the same order of instructions. In this way the cache of a single processor/memory unit serves as a model for the contents of all other cache for the purpose of that single processor/memory deciding when to transmit program instructions or data to other processor/memory units.

The foregoing and other objects and advantages of the invention will appear from the following description. In this description reference is made to the accompanying drawings which form a part hereof and in which there is shown by way of illustration a preferred embodiment of the invention. Such embodiment does not necessarily represent the full scope of the invention, however, and reference must be made therefore to the claims for interpreting the scope of the invention.

DETAILED DESCRIPTION OF THE INVENTION

Figure 1:
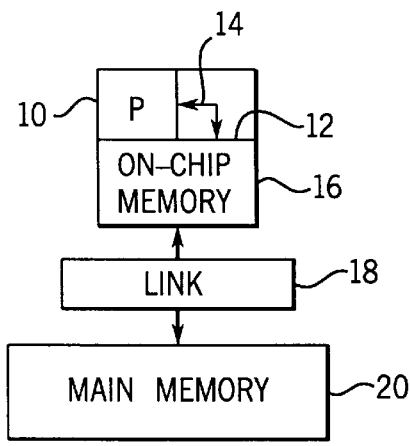
FIG. 1 is a schematic representation of a prior art computer system having small amounts of on-chip memory and a large external main memory.

Referring now to FIG. 1, in a prior art computer architecture, a central processing unit 10 may include a certain amount of on-chip memory 12 including cache and fast random access memory. The processor 10, on-chip memory 12, and channel 14 are fabricated as a single integrated circuit 16 and the on-chip memory 12 communicates with the processor 10 by means of a high speed communication channel 14 also part of integrated circuit 16.

The integrated circuit 16 communicates via an external interconnect 18 to a main memory 20, the latter which may be composed of many integrated circuits. Generally, the interconnect 18 is substantially slower (i.e., has a lower data rate and is narrower) than the channel 14.

The processor 10 may be an out-of-order processor with speculation, as is understood in the art. Thus while the processor 10 is waiting for data transfer from memory 20 required by a first instruction of an executed program, it may execute other later instructions in its program. Out-of-order processing takes advantage of the fact that some instructions do not depend on the resolution of earlier instructions for independent data.

The processor may also perform data or instruction speculation in which instructions that are dependent on the resolution of earlier instructions are executed ahead of their normal order in the program. In this process, instructions are 'issued' out of order at which time certain preliminary steps of execution may be undertaken. The instructions are then 'committed' in order at rapid pace based on this out-of-order preparatory execution.

Sometimes, instructions speculatively executed should not have been executed. For example, instructions may be executed speculatively after a branch statement that has not been resolved. If the branch is resolved in a manner that would indicate the instructions should not have been executed, these executed instructions must be 'squashed' and the correct instructions executed. Techniques for out-of-order and speculative processing are well known in the art.

Figure 2:
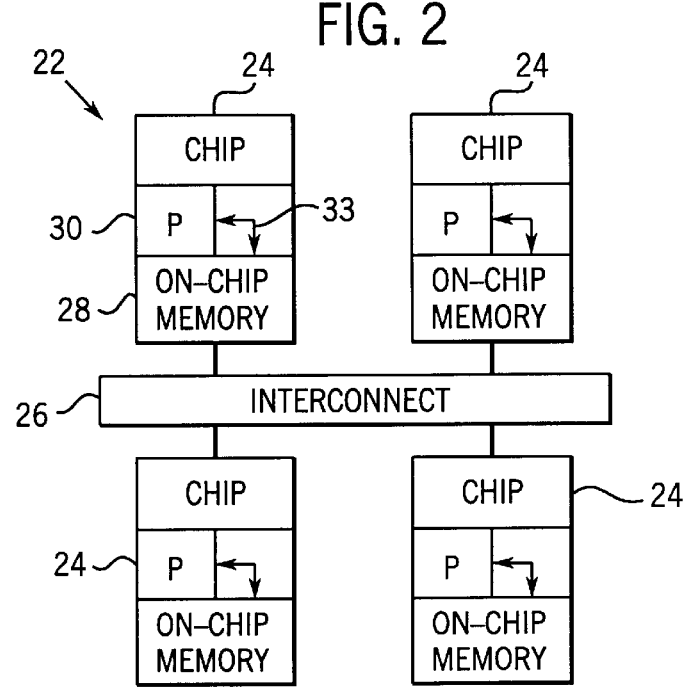
FIG. 2 is a figure similar to that of FIG. 1 showing the architecture of the present invention in which the main memory is distributed among many processors as on-chip memory.

Referring now to FIG. 2, the present invention provides a distributed memory machine 22 having a number of integrated memory/processor units ('chips') 24 each having a memory 28 and a processor 30 fabricated on a single integrated circuit. As with processor 10, processor 30 provides out-of-order instruction processing and speculation. On-chip memory 28 is conventional high speed solid state memory and includes a cache structure 29 communicating with processor 30 via a high speed communication channel 33 on the chip 24.

Each chip 24 is connected to the others by a common communication interconnect 26. In this architecture, all the memory requirements are provided by on-chip memory 28.

Figure 3:
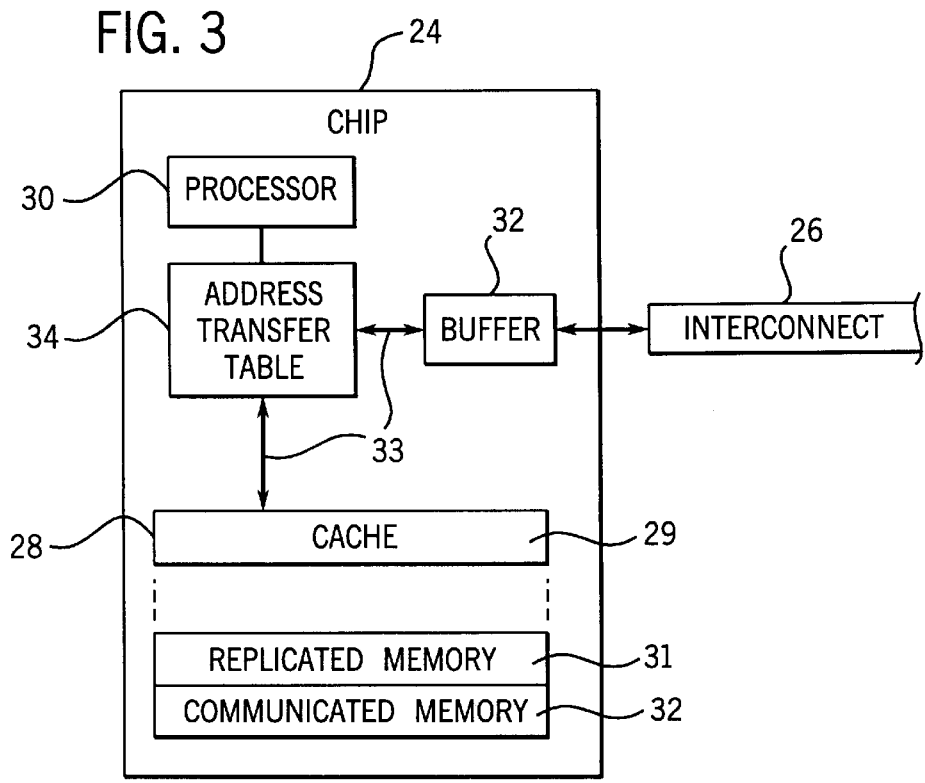
FIG. 3 is a detailed block diagram of a single processor of FIG. 2 showing a buffer to the interconnect, an address transfer table, a cache; and a memory divided into replicated and communicated portions.

Referring now to FIG. 3, the processor may read data and instructions from, and write data to the on-chip memory 28 or a buffer 32 communicating with the interconnect 26. These exchanges are moderated by an address transfer table 34 which maps address space of the distributed memory machine 22 into local physical addresses in on-chip memory 28 or into buffer 32.

The address transfer table 34 further divides the address space of the distributed memory machine 22 for the purpose of that chip 24 into three categories: (1) replicated, (2) communicated, and owned, and (3) communicated and not owned, to be described below. The address transfer table 34 may be programmed by the operating system as is well understood in the art.

Figure 4:
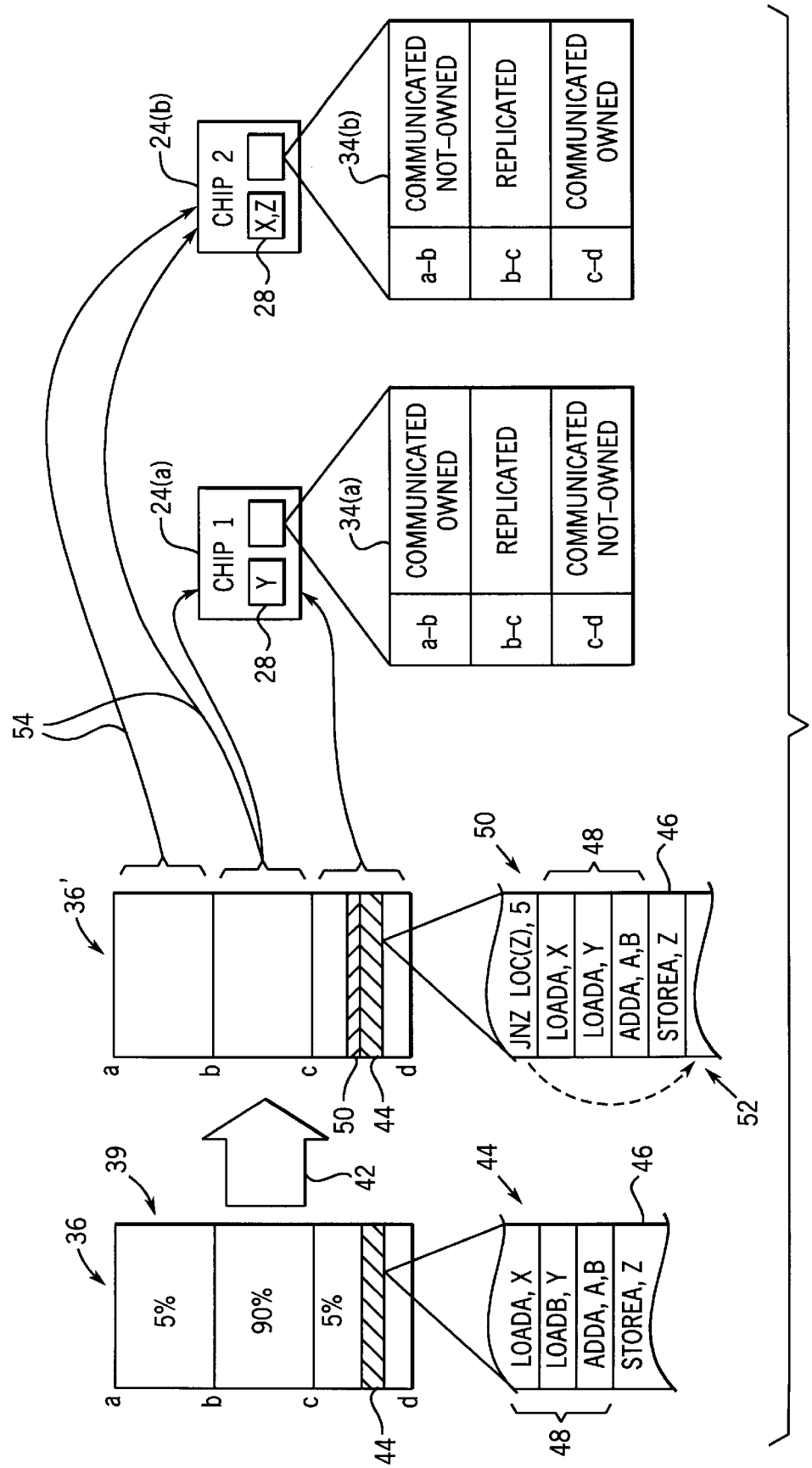
FIG. 4 is a flow diagram showing the processing of a computer program according to the present invention in which highly used portions of the program are loaded into multiple processors and lesser used portions are loaded into less than all the processors and showing the insertion of data-location sensitive jumps into the program.

Referring now to FIG. 4, each chip 24 will execute the same program 36, but will not at a given instant in time hold the entire program 36. Even though a given chip 24 does not have the entire program 36 in on-chip memory 28, it is able to execute the entire program 36 by having the necessary instructions and data transferred to it as will be described. As used herein, the program will generally refer not only to the instructions, but to the data used by the program.

Figure 6:
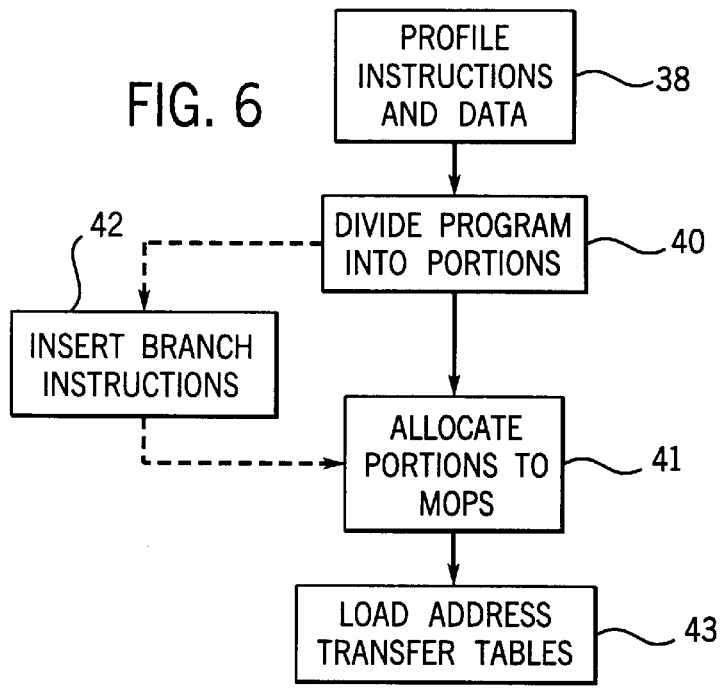
FIG. 6 is a flow chart describing the steps of FIG. 5.

Initially, however, the division of the instructions (rather than data) among the chips 24 will be described. Referring to FIGS. 4 and 6, in a first step 38 in preparing a program 36 for execution on the distributed memory machine 22 of the present invention, program 36 is profiled. As is understood in the art, profiling is a process for collecting the statistics on how a program executes, and in particular, identifying those lines or instructions of the program 36 that tend to be executed more than other instructions of the program. One method of profiling executes the program while sampling the instruction being executed on a regular basis through an interrupt process or the like. A similar process may be used to determine data values that are accessed more frequently than other data values.

These profiling statistics are collected to assign each instruction or data value with percentage figures indicating the likelihood that a given instruction in the program will be executing during a predetermined period of operation of the program 36.

At step 40, the program 36 is then divided into portions 39 based on the frequency with which the instructions of the portions are executed. The portions 39 need not include contiguous instructions or data; however, generally, it will be desirable that blocks of related instructions and data be grouped together.

At step 41, the portions are loaded into the chips 24. The allocation is performed so that portions 39 of the program that are run or accessed frequently are placed in all of the chips 24, whereas portions that are infrequently executed are distributed among single chips 24. One way to accomplish this is to rank portions 39 of the program 36 according to frequency of usage and collect portions by their ranking until the portions represent a predetermined percentage, for example 90 percent of the execution time determined by profiling.

In example FIG. 4, the program 36 has four portions separated at addresses a, b, c, and d. The portion 39 from addresses b to c is identified by the profiling as including the most frequently accessed instructions of the program 36 whereas portions from addresses a through b and c through d are less frequently accessed and will be ultimately provided to only a single chip 24. The same procedure may be done with the profiling information on the data and the data distributed similarly.

Optionally, at step 42, portions 39 to be loaded in only a single chip 24 are analyzed to find instructions 44 that culminate in a store instruction 46. Referring to portion 39 of program 36 from addresses c to d and instructions 44 includes the following:

|  |  |
|---|---|
| LOADA | X |
| LOADB | Y |
| ADDA | A, B |
| STOREA | Z |

In this example, the LOADA and LOADB instructions load registers A and B with the variables to the right of the instruction (X and Y). The ADDA instruction adds the variables to its right into the register A and the STOREA instruction takes the value of the register A and places it in the variable to its right. Thus two values X and Y are obtained from memory, summed and stored in memory at Z.

These instructions 44 include a 'location validated' store instruction 46 in which a value is stored at a memory location that will be local to only one of the chips 24. Antecedent instructions 48, prior to the store instruction 46 are solely for the purpose of obtaining the value Z which will ultimately be stored, and thus are also location validated.

As will be described in more detail below, only a single chip 24 having the value Z allocated to its on-chip memory 28 needs to perform location validated instructions. The other chips 24 performing these instructions will simply discard the value of Z (there is no need for them to transmit Z to the chip 24 having Z allocated to its memory because that chip will have independently computed Z). Accordingly, the other chips 24 may skip location validated instructions 46 and 48 (as includes the ADDA instruction).

For this purpose, at optional step 42, a branch instruction 50 may be added to the portion 39 of program 36 so that the instructions 44 and 50 read together as:

|  |  |
|---|---|
| JNZ | LOC(Z), 5 |
| LOADA | X |
| LOADB | Y |
| ADDA | A, B |
| STOREA | Z |

Here the JNZ instruction is a five instruction jump conditional on the value of LOC(Z) not being zero. The function LOC(Z) is a test of whether the value Z is held in the local memory of the particular chip and is set by the loader performing the allocation of the program among the chips 24 per step 41. It should be noted that the branch 50 may always be evaluated locally at all chips and thus does not represent a speculation.

If the value of Z is cached at the chip and the STOREA instruction is skipped, then Z must be invalidated in the cache.

Alternatively, the STOREA instruction may be squashed by special hardware which automatically tests the destination of the store by means of the same mechanism as the LOC instruction. In this case, all instructions of the program are in fact executed by each chip but the bandwidth required by the data write operation of selected STORE instructions may be eliminated.

In this case, as depicted in FIG. 4, chip 24(a) has only the value Y stored in on-chip memory 28. Accordingly, when chip 24(a) executes the portion 39 from addresses c to d, it will jump around the location validated instructions 48 and 46.

Chip 24(b) however, having the value Z allocated to its on-chip memory 28, will execute location validated instructions 48 through 46 by not jumping at instruction 50.

Referring still to FIGS. 4 and 6, the program 36' is divided among the chips 24(a) by a loader as indicated by the arrows 54. As described above, seldom executed portion 39 from addresses a to b is loaded into the on-chip memory 28 of chip 24(b) and seldom used portions 39 from addresses c through d are loaded into the on-chip memory 28 of chip 24(a). Frequently used portion 39 from addresses b through c is loaded into the memories of both chips 24(a) and 24(b).

By having commonly executed portions 39 loaded into and executed by multiple chips 24, the need to communicate the resultant data and states of these portions 39 among the other chips 24 is eliminated. This is in direct contrast to more traditional parallel processing which tries to divide up frequently executed portions of the program among different processors.

Referring to FIGS. 3, 4, and 6, after the allocation of the program of step 41, the address transfer tables 34 a and 34(b) of chips 24(a) and 24(b), respectively, are loaded to direct the processor 30 of the chip 24 to proper addresses in the on-chip memories 28. The address transfer table 34 accepts any address in the address space of the distributed memory machine 22 and maps it to a physical address of the on-chip memory 28. As such the address transfer table 34 may be a look-up table stored in a specialized memory cell such as is commonly understood in the art.

Referring to FIG. 4, according to the allocation of the program 36 described above, one column of the address transfer table 34(a) of chip 24(a) provides entries for the full range of addresses for the distributed memory machine 22. A second column (not shown) provides the corresponding addresses in on-chip memories 28, if any. The address transfer tables 34 also includes a third column characterizing the addresses according to how the program portions 39 have been allocated. For example, for chip 24(a), the address transfer table 34(a) will indicate that address range a through b is a communicated portion of memory (indicating that it is not loaded into all chips 24) and that it is owned by chip 24 because it is loaded into chip 24(a)'s local memory 2. Addresses b through c for chip 24(a) will be identified as replicated memory, meaning that the data and programs of this address range are located into each chip 24. Finally, for chip 24(a) addresses c through d are indicated to be communicated, but not owned, meaning that they are not stored in on-chip memory 28 for chip 24(a).

The address transfer table 34(b) of chip 24(b) is similar except that addresses a through b are indicated to be communicated and not owned, addresses b through c are indicated to be replicated, and addresses c through d are indicated to be communicated and owned.

This characterization of the memory of each chip 24 affects how certain instructions are executed according to the following Table 1.

TABLE 1

| Instruction type | Memory type | Action |
|---|---|---|
| LOAD | REPLICATED | Fetch from memory |
| LOAD | COMMUNICATED and NOT OWNED | Fetch from interconnect |
| LOAD | COMMUNICATED and OWNED | Fetch from memory and transmit on interconnect |
| STORE | REPLICATED | Store to memory |
| STORE | COMMUNICATED and NOT OWNED | No action |

TABLE 1-continued

| Instruction type | Memory type | Action |
| --- | --- | --- |
| STORE | COMMUNICATED and OWNED | Store to memory and do not transmit on interconnect |

As indicated in this Table 1, the processor 30 of the chip 24 take different actions according to whether a LOAD and STORE instruction is being executed and according to whether the instructions are addressing replicated or communicated memory. In addition, there is a distinction in the action if the communicated memory is owned or not owned.

Generally, a processor loads from and stores to replicated memory with no further action. A load from communicated and owned memory is accompanied by a broadcasting of the loaded value to the other chips who read the value instead from the interconnect buffer.

Referring now to FIG. 6, an example of the operation of the chips 24 includes the execution of the following fragment of program 36" by chip 24(a) having only data value Y of data values X, Y, and Z in its on-chip memory 28:

|  |  |
| --- | --- |
| LOADA | X |
| LOADB | Y |
| ADDA | A, B |
| STOREA | Y |
| STOREA | Z |

In this case, for chip 24(a) data value X will be communicated and not owned, data value Y will be communicated and owned, and data value Z will be communicated and not owned.

Figure 5:
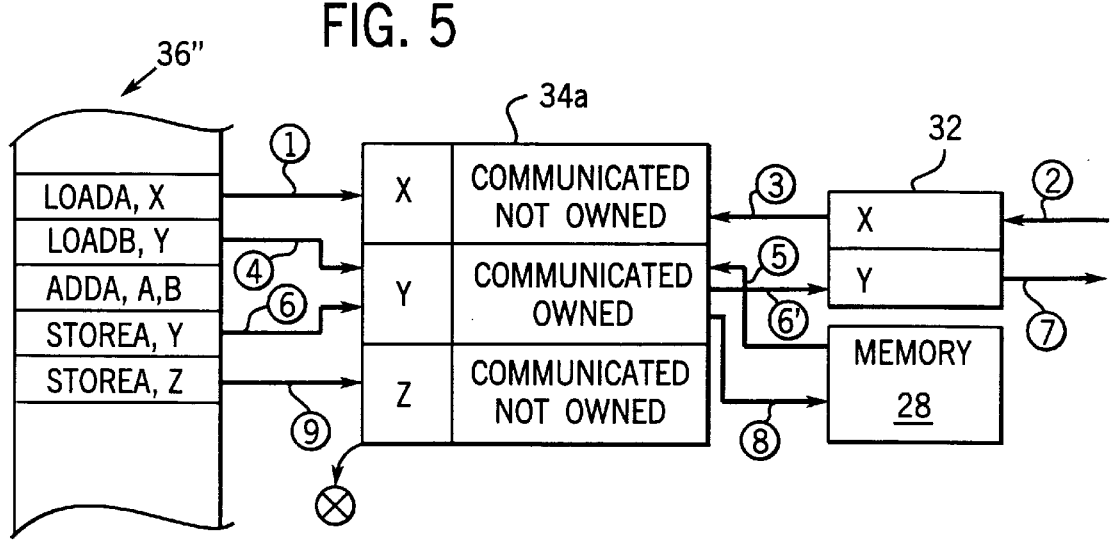
FIG. 5 is a schematic representation of the execution of the program on one of the processors of FIG. 2 showing the flow of data between the program memory and the interconnect buffer depending on the address transfer table.

In FIG. 5, data transfers are indicated by arrows associated with circled sequence numbers indicating generally the order of the steps. In a first step, the processor of chip 24(a) executing the LOADA, X instruction refers to the address transfer table 34(a) to determine that X is communicated and not owned. Accordingly, the value X will not be found in on-chip memory and by the rule in Table 1, the processor of chip 24(a) goes to the interconnect buffer 32 to check for X.

At the same time, the chip 24(b) (not shown in FIG. 5) executing the same program 36" finds that X is communicated and owned and according to the rules of Table 1 transmits X on the interconnect as indicated by the arrow of sequence number 2 where it is received by buffer 32.

The processor of chip 24(a) then receives X from the buffer 32 as indicated by the arrow of sequence number 3. As was described above, chip 24(a) was not required to transmit a request for the value of X from chip 24(b). Instead, chip 24(b) independently sent this value X reducing the time that would normally be required to request and receive X from another chip.

Because the processor of chip 24(a) can execute out of order instructions, if the data is not yet in the buffer 32, the chip 24 enters a stall for that instruction and other out-of-order instructions may be executed.

At a next step indicated by the arrow of sequence number 4, the processor executing the LOADB, Y instruction refers to the address transfer table 34(a) to find that Y is communicated and owned. Accordingly, as indicated by the arrow of sequence number 5, Y may be obtained directly from on-chip memory 28 of chip 24(a). At the same time as indicated by the arrows of sequence numbers 6 and 6', the value of Y is broadcast on the interconnect as indicated by the arrow of sequence number 7 by loading Y into the outgoing portion of buffer 32.

The 'ADDA B' instruction may be executed without further data loads or stores.

The processor may next move to the 'STOREA Y' instruction where it determines that Y is communicated and owned again by reference to the address transfer table 34(a). In this case, the processor need only store the value of Y in on-chip memory 28 as indicated by the arrow of sequence number 8.

In contrast at the next instruction 'STOREA Z' where a reference to an address transfer table 34(a) indicated by the arrow of sequence number 9 reveals that Z is communicated and not owned. This results in no storage operation at all indicated by the circle with the cross in it. There is no need to transmit this value Z to the chip having Z in on-chip memory because that chip will have also calculated Z independently.

In this case, the instructions prior to the 'STOREA Z' are not location validated instructions to be branched around because one of the resultant values of Y or Z is local to chip 24(a) and chip 24(i b).

The above example describes data being loaded or stored, but the same process will occur for the fetching of instructions following the same rules as a load or store of a data value.

As has been described, this process substantially reduces the overhead in communicating data between distributed memories in the execution of a single program 36 having data and instructions distributed among different chips. Additional reductions in the communications between chips is provided by the profiling operation described above in which commonly executed portions 39 of the code are loaded into each of the chips 24(a). The use of these commonly loaded code portions 39 reduces the need to transfer the information between chips during the execution of these common code portions 39 and at the conclusion of the execution of these code portions 39.

Referring again to FIG. 3, generally, the processor 30 in fetching data or instructions provides an address within the address space of the distributed memory machine 22 to the address transfer table 34. In a chip that incorporates a cache, the data is loaded from or stored to the cache as if the cache were replicated memory following the rules of Table 1 above, i.e., without additional interconnect communications until the data are evicted from the cache.

If the address of the data or instructions are not found in the cache 29, then the remaining on-chip memory 28 (replicated memory 31 or communicated-owned memory 32) or the interconnect buffers 32 are accessed as described above.

Thus, implementation of the cache 29 with the above system requires only that any hit on the cache be interpreted as the information being sought be in replicated memory. The underlying assumption is that all caches of all the chips 24 have 'correspondent' values, that is a hit on one cache for a particular program address of data or instruction will in due course cause a hit on all other caches. This assumption will normally be true except for certain sequences of out-of-order instruction which may cause a premature overwriting of cache data. This concern may be remedied by the use of a holding buffer structure into which fetched values for issued instructions are temporarily stored. The values in the holding buffer structure are transferred to the cache only when the issued instructions commit. By updating the cache only at the time the instructions commit (and knowing that even in processors that execute instructions out-of-order, that the instructions commit in the same order), each cache will experience the same order of data or instruction loading and thus be correspondent as required.

It will be understood from this description that the present invention provides considerable speed advantages beyond those obtained from the effective anticipation of one chip of the other chips requests for data or instructions, resulting from the ability of the processors to execute instructions out of order. Because the other chips need not stop execution when waiting for data or instructions, but may go on to execute other instructions, the processors collectively may fully take advantage of a single chip experiencing a run of instructions that are local and operating on local data.

It will be understood, further, that in the case of indirectly addressed data (where the processor must read a first memory location to obtain an address for a second memory location having the data) when the data of the two memory locations arrive in rapid succession at the buffers of other chips (not having the data locally) without the normal delays associated with resolving indirect addresses.

The above description has been that of a preferred embodiment of the present invention. It will occur to those that practice the art that many modifications may be made without departing from the spirit and scope of the invention. For example, the chips 24 may be part of one larger integrated circuit and the interconnect 26 may be an on-chip communications channel. In order to apprise the public of the various embodiments that may fall within the scope of the invention, the following claims are made.

We claim:

1. A method of executing a program made up of a set of instructions and data, the instructions having a program order on a computer system comprised of a plurality of processor/memory units communicating on a common interconnect, the method comprising the steps of:
   (a) dividing the set among the processor/memory units;
   (b) executing all instructions on each of the processor/memory units by causing a first processor/memory unit having a portion of the set not loaded into other processor/memory units to communicate that portion over the common interconnect to at least some of the other processor/memory units without a request by the other processor/memory units for the portion; and
   (c) causing at least one other processor/memory unit to process other portions of the set while waiting for the portion over the common interconnect.

2. The method of claim 1 wherein the first processor/memory unit communicates the portion in response to the first processor/memory unit's processing the portions in its execution of the program.

3. The method of claim 1 wherein the communicated portion is data.

4. The method of claim 3 wherein the communicated portion is instructions.

5. The method of claim 1 wherein the portion includes a datum and wherein execution of instructions by each processor/memory unit of step (b) does not complete store operations for the datum in those processor/memory units not having the portion.

* * * * *

UNITED STATES PATENT AND TRADEMARK OFFICE
CERTIFICATE OF CORRECTION

PATENT NO. : 5,943,501
DATED : Aug. 24, 1999
INVENTOR(S) : Douglas C. Burger et al.

It is certified that error appears in the above-identified patent and that said Letters Patent is hereby corrected as shown below:

Col. 4, line 58, delete "band c" and insert --b and c--.

Col. 8, line 23, delete "24(ib)" and insert --24(b)--.

Signed and Sealed this

Twenty-eighth Day of November, 2000

Attest:

Q. TODD DICKINSON

Attesting Officer     Director of Patents and Trademarks